April 14, 1931.   G. O. JOHNSON   1,800,889
CYCLE FRAME AND CRANK HANGER CONSTRUCTION
Filed May 29, 1930
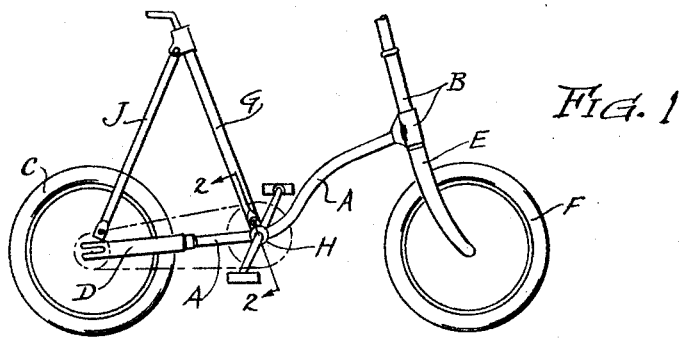
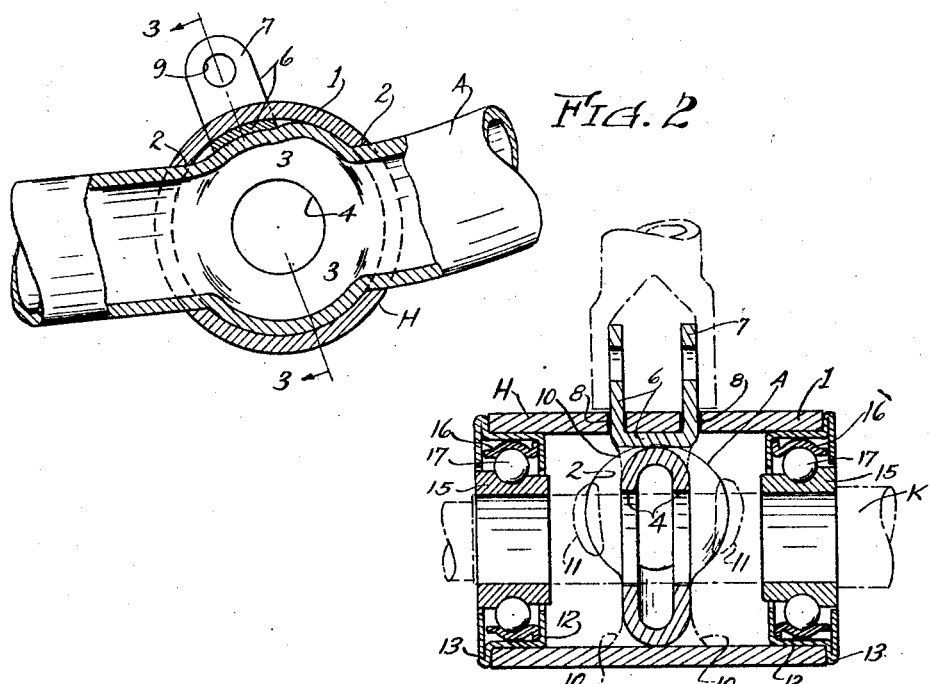
Inventor
Gustaf O. Johnson
By Bates, Goldrick & Teare
Attorney Patented Apr. 14, 1931

1,800,889

UNITED STATES PATENT OFFICE

GUSTAF O. JOHNSON, OF ELKHART, INDIANA, ASSIGNOR TO MURRAY-OHIO MANUFACTURING COMPANY, OF CLEVELAND, OHIO, A CORPORATION OF OHIO

CYCLE FRAME AND CRANK-HANGER CONSTRUCTION

Application filed May 29, 1930. Serial No. 457,250.

An object of this invention is to provide a simplified, strong and rigid shaft hanger for use, for example, in a cycle frame as a support for the crank shaft.

Another object is to provide a simple and rigid joint between two tubular parts, such as exemplified particularly by the sill or center bar of a bicycle and the crank shaft housing or support.

Other objects of the invention, and the distinctive advantages thereof will become apparent from the following description relating to the accompanying drawing. Only the preferred embodiment is illustrated. The essential novel characteristics appear in the claims.

Referring briefly to the drawing, Fig. 1 is a side elevation of a sidewalk bicycle; Fig. 2 is a fragmentary substantially central longitudinal sectional view of the crank or pedal shaft hanger and associated parts of a bicycle such as shown in Fig. 1, and Fig. 3 is a sectional view through the hanger as indicated by the line 3—3 on Fig. 2.

In structures such as shown, the common practice is to make the sill bar elements which support the crank shaft housing, in two parts, and to provide a casting or similarly formed fitting, machined to receive the adjacent ends of such parts and likewise machined to receive the bearings for the shaft. Some types of bicycles have a single, unitary bar as a central main frame element, to which the crank shaft housing is usually secured, either above or below the bar. Both these and other common types of constructions, as known to me, prior to my invention, are very expensive, due mainly to the cost of the necessary machining and assembling operations. I have obviated the necessity for a great amount of this expense, while notwithstanding, have provided a very rigid frame and shaft hanger structure, as will be presently shown.

Referring again to the drawing, Fig. 1 shows, by way of example, a conventional type of side-walk bicycle, having a center bar or sill A, suitably connected to a steering column B at its front end, and to the rear traction wheel C, at its rear end, as through any suitable rear wheel fork arrangement D.

The steering column may carry the usual steering fork for a front steering wheel F. The seat (not shown) is carried by a mast G rising from the crank shaft hanger structure H, supported on the bar A, and, additionally, by a back-stay member or strut J connected with the mast, at its upper end in any suitable manner, and at its lower end with the rear wheel supporting arrangements (not shown).

The essential novelty of the invention illustrated is concerned only with the crank hanger and associated parts.

As illustrated, the crank shaft (shown in broken lines at K, Fig. 3) extends through a cross tube 1 which latter may, as a matter of fact, take any form but which, by virtue of my invention, may readily comprise simply a cylindrical tube, cut to length from suitable tubular stock, seamless or otherwise. This tube is bored or punched to provide substantially mutually registering openings 2 for the sill bar A, the latter also comprising a section of ordinary metal tube, properly shaped as by bending, forwardly, and, if desired, rearwardly from the hanger.

To provide the essential rigidity for supporting the crank-shaft; to provide for effectively holding the tube 1 in place on the sill bar; and to increase the vertical dimensions of the stock, forming the tube A, I employ the simple device of flattening the portion of the tube A as at 3, where the tube A lies within the tube 1, causing it to spread out in a vertical plane and to (in this plane) substantially fill the tube 1. This spreading out of the tube, in addition to the above stated and other obvious advantages, provides flat surfaces on both sides of the enlarged portion 3, which may be easily drilled or otherwise apertured, as at 4, to provide entrance for the crank shaft.

Because of the fact that the weight of the rider is largely transmitted through the mast G, the additional strength (in a vertical plane) of the spread out portion 3 adequately resists the tendency of the sill bar to bend at the hanger.

A further feature of the invention is the provision of a simple securing means for an attaching bracket or support for the mast G. In almost any form, the lower end G of the mast is adapted to be supported by a U-shaped bracket 6, having a cross portion lying within the tube 1 and ears 7 extending through openings 8 in the top wall of the tube. The bracket 6 is put into place before the stock forming the sill bar is inserted, as will be obvious, and after this stock has been flattened, as above described, the bracket is firmly held, as will be obvious from Figs. 2 and 3. Any suitable arrangement, such as a pin or bolt, (not shown) may be used to couple the mast rigidly to the bracket, the bracket ears having openings at 9 for this purpose.

If desired, additional rigidity may be afforded by welding the various parts preferably interiorly of the tube 1, as by electric arc welding at 10 and 11.

The arrangement above described is very well adapted to support standard forms of antifriction bearings for the crank shaft. As shown, there are ball-bearing assemblies having outer casing shells 12, flanged at 13 to abut the ends of the tube 1, and which shells may be simply pressed into the ends of the tube. The bearings, as shown, have inner and outer race members 15 and 16 respectively and interposed balls 17. The bearing arrangement is shown and described, only by way of example. Any other form may be used as well.

I claim:

1. In a frame structure of the class described, two tubes in mutually crossing relationship, one being apertured to receive the other, and means to hold the tubes rigidly together, comprising a flattened and thereby enlarged portion of the innermost tube.

2. In a vehicle frame, two tubes with their axes normal to each other, one being apertured in its opposite walls, and the other extending through the apertures, the latter tube having the portion thereof embraced by the former, flattened to cause such portion to substantially fill the first mentioned tube transversely thereof.

3. A shaft hanger structure comprising two tubular members, one having transverse apertures, the apertured member being adapted to form the housing for such shaft, said other member being inserted into the aperture and spread out within the housing forming member and enlarged thereby in a plane transversely of the housing member, there being openings in the spread-out portion to receive such shaft.

4. In a cycle frame, a hollow sill bar and a tubular crank shaft housing positioned at right angles thereto to receive and form a support for such shaft, the housing having apertures in its forwardly and rearwardly disposed walls respectively, the sill bar extending through the apertures for connection to the front and rear mechanisms of the cycle and being vertically widened within the housing to maintain the tube in position on the frame.

5. In a frame a plurality of arm members, a tubular member forming a connection for said arms, the tubular member being apertured to receive one of the arms, said latter arm being hollow and having a widened portion within the tubular member in a plane transverse to the axis of the tubular member, and means to attach another arm to the tubular member comprising additional apertures in the wall of the tubular member, and an attaching device for the last mentioned arm extending through said additional apertures, and held in place by engagement with said widened portion of one of the arms.

6. A frame structure according to claim 5, wherein the said attaching device comprises a U-shaped bracket member having its base engaged and held by the said widened portion of one of the arms interiorly of the tubular member, the sides of the U-member extending through the additional apertures in the wall of the tubular member as a bifurcated support.

7. In a cycle frame, a crank shaft, a hollow sill bar and a tubular crank shaft housing positioned at right angles thereto, to receive and form a support for said crank shaft, said housing having apertures in its forwardly and rearwardly disposed walls, respectively, the sill bar extending in one piece through the apertures for connection to the front and rear mechanism of the cycle, and being apertured at opposite sides to receive such crank shaft, there being means to rigidly secure the sill bar and tubular housing together.

8. In a cycle frame, a crank shaft, a hollow sill bar and a tubular crank shaft housing positioned at right angles thereto to receive and form a support for said shaft, means to prevent relative movement between said sill bar and said tubular crank shaft housing, the housing having apertures in its forwardly and rearwardly disposed walls, respectively, the sill bar extending through the apertures for connection to the front and rear mechanism of the cycle, said housing having additional spaced apertures and a U-member extending through said additional apertures, and means associated with the housing for rigidly securing the U-member in place, said U-member forming a bracket for another member of said cycle frame.

In testimony whereof, I hereunto affix my signature.

GUSTAF O. JOHNSON.